(12) United States Patent
Landau-Holdsworth et al.

(10) Patent No.: US 8,564,403 B2
(45) Date of Patent: Oct. 22, 2013

(54) METHOD, SYSTEM, AND APPARATUS FOR DISTRIBUTING ELECTRICITY TO ELECTRIC VEHICLES, MONITORING THE DISTRIBUTION THEREOF, AND/OR CONTROLLING THE DISTRIBUTION THEREOF

(76) Inventors: Mario Landau-Holdsworth, San Francisco, CA (US); Amber Case, Portland, OR (US); Adan Vielma, Portland, OR (US)

( * ) Notice: Subject to any disclaimer, the term of this patent is extended or adjusted under 35 U.S.C. 154(b) by 494 days.

(21) Appl. No.: 12/684,021

(22) Filed: Jan. 7, 2010

(65) Prior Publication Data

US 2010/0237985 A1 Sep. 23, 2010

Related U.S. Application Data

(60) Provisional application No. 61/161,358, filed on Mar. 18, 2009.

(51) Int. Cl.
*G05B 19/00* (2006.01)
(52) U.S. Cl.
USPC ............................................. 340/5.8; 340/5.2
(58) Field of Classification Search
USPC ........ 340/5.2, 528, 5.8; 702/60, 63; 701/22, 2
See application file for complete search history.

(56) References Cited

U.S. PATENT DOCUMENTS

| | | | |
|---|---|---|---|
| 4,532,418 A | 7/1985 | Meese et al. | |
| 5,184,058 A | 2/1993 | Hesse et al. | |
| 5,272,431 A | 12/1993 | Nee | |
| 5,323,099 A | 6/1994 | Bruni et al. | |
| 5,327,066 A | 7/1994 | Smith | |
| 5,349,535 A * | 9/1994 | Gupta ............................. 702/63 |
| 5,369,352 A * | 11/1994 | Toepfer et al. ................ 320/110 |
| 5,422,624 A | 6/1995 | Smith | |
| 5,461,298 A * | 10/1995 | Lara et al. ..................... 320/109 |
| 5,461,299 A | 10/1995 | Bruni | |
| 5,467,006 A | 11/1995 | Sims | |
| 5,499,181 A | 3/1996 | Smith | |
| 5,548,200 A | 8/1996 | Nor et al. | |
| 5,563,491 A | 10/1996 | Tseng | |

(Continued)

FOREIGN PATENT DOCUMENTS

| | | |
|---|---|---|
| JP | 2006074868 A1 | 3/2006 |
| JP | 2008083022 A1 | 4/2008 |
| JP | 2008295136 A1 | 12/2008 |

OTHER PUBLICATIONS

Pudar, 61/44009, Provisional Application Specification, p. 5-Par. 18.*

(Continued)

*Primary Examiner* — Jennifer Mehmood
*Assistant Examiner* — Rufus Point
(74) *Attorney, Agent, or Firm* — David A. Crowther

(57) ABSTRACT

A method, system, and apparatus for distributing electricity to electric vehicles, monitoring the distribution thereof, and/or controlling the distribution thereof, provides various components to vehicle operators and station owners to track and control energy usage. Plug outlet devices are associated with a station. A coordinator element is configured to receive vehicle information and information about the station from one or more electric vehicles. The information is verified, stored, and/or aggregated for later display. In addition, the information can be used to determine whether or not to deny electrical charging service to a vehicle using a switch component.

47 Claims, 13 Drawing Sheets

(56) References Cited

U.S. PATENT DOCUMENTS

| | | | |
|---|---|---|---|
| 5,594,318 A | 1/1997 | Nor et al. | |
| 5,684,379 A | 11/1997 | Svedoff | |
| 5,717,374 A | 2/1998 | Smith | |
| 5,742,229 A | 4/1998 | Smith | |
| 5,790,976 A * | 8/1998 | Boll et al. | 455/456.5 |
| 5,806,018 A | 9/1998 | Smith et al. | |
| 5,847,537 A | 12/1998 | Parmley, Sr. | |
| 5,914,654 A | 6/1999 | Smith | |
| 5,926,004 A | 7/1999 | Henze | |
| 5,927,938 A * | 7/1999 | Hammerslag | 414/809 |
| 6,018,293 A | 1/2000 | Smith | |
| 6,067,008 A | 5/2000 | Smith | |
| 6,185,501 B1 | 2/2001 | Smith et al. | |
| 6,307,347 B1 | 10/2001 | Ronning | |
| 6,463,967 B1 | 10/2002 | Boyle | |
| 6,614,204 B2 | 9/2003 | Pellegrino et al. | |
| 6,727,809 B1 | 4/2004 | Smith | |
| 6,771,188 B2 * | 8/2004 | Flick | 340/989 |
| 6,850,898 B1 * | 2/2005 | Murakami et al. | 705/13 |
| 6,859,009 B2 | 2/2005 | Jablin | |
| 6,864,807 B2 * | 3/2005 | Todoriki et al. | 340/988 |
| 7,058,524 B2 | 6/2006 | Hayes et al. | |
| 7,068,991 B2 | 6/2006 | Parise | |
| 7,298,289 B1 * | 11/2007 | Hoffberg | 340/903 |
| 7,358,851 B2 * | 4/2008 | Patenaude et al. | 340/438 |
| 7,373,247 B2 * | 5/2008 | Park | 701/451 |
| 7,602,274 B2 * | 10/2009 | Lee et al. | 340/10.2 |
| 7,616,105 B2 * | 11/2009 | Macielinski et al. | 340/439 |
| 7,737,829 B2 * | 6/2010 | Nishiyama | 340/425.5 |
| 7,994,908 B2 * | 8/2011 | Tonegawa et al. | 340/538 |
| 7,999,665 B2 * | 8/2011 | Chander et al. | 340/455 |
| 8,000,074 B2 * | 8/2011 | Jones et al. | 361/93.1 |
| 8,054,048 B2 | 11/2011 | Woody et al. | |
| 8,093,861 B2 * | 1/2012 | Christensen | 320/109 |
| 2002/0070881 A1 * | 6/2002 | Marcarelli et al. | 340/988 |
| 2003/0120442 A1 * | 6/2003 | Pellegrino et al. | 702/60 |
| 2003/0209375 A1 | 11/2003 | Suzuki et al. | |
| 2005/0052286 A1 * | 3/2005 | Perraud et al. | 340/825.72 |
| 2005/0143955 A1 | 6/2005 | Quint et al. | |
| 2007/0126395 A1 | 6/2007 | Suchar | |
| 2007/0278998 A1 | 12/2007 | Koyama | |
| 2008/0039989 A1 * | 2/2008 | Pollack et al. | 701/22 |
| 2008/0208401 A1 * | 8/2008 | Kumar et al. | 701/19 |
| 2009/0021213 A1 * | 1/2009 | Johnson | 320/109 |
| 2009/0030712 A1 | 1/2009 | Bogolea et al. | |
| 2009/0062967 A1 * | 3/2009 | Kressner et al. | 700/286 |
| 2009/0066287 A1 | 3/2009 | Pollack et al. | |
| 2009/0079388 A1 | 3/2009 | Reddy | |
| 2009/0082957 A1 * | 3/2009 | Agassi et al. | 701/208 |
| 2009/0091291 A1 * | 4/2009 | Woody et al. | 320/109 |
| 2009/0184833 A1 * | 7/2009 | Tonegawa et al. | 340/636.2 |
| 2009/0192927 A1 * | 7/2009 | Berg et al. | 705/34 |
| 2009/0195349 A1 | 8/2009 | Frader-Thompson et al. | |
| 2009/0210357 A1 * | 8/2009 | Pudar et al. | 705/412 |
| 2009/0237239 A1 * | 9/2009 | McSheffrey | 340/539.24 |
| 2009/0251300 A1 * | 10/2009 | Yasuda et al. | 340/426.1 |
| 2009/0261779 A1 * | 10/2009 | Zyren | 320/109 |
| 2009/0313103 A1 | 12/2009 | Ambrosio et al. | |
| 2010/0049737 A1 * | 2/2010 | Ambrosio et al. | 707/104.1 |
| 2010/0060452 A1 * | 3/2010 | Schuster et al. | 340/572.1 |
| 2010/0065627 A1 | 3/2010 | Outwater | |
| 2010/0153193 A1 * | 6/2010 | Ashby et al. | 705/13 |
| 2010/0161480 A1 | 6/2010 | Littrell | |
| 2010/0161481 A1 * | 6/2010 | Littrell | 705/40 |
| 2010/0174667 A1 | 7/2010 | Vitale et al. | |
| 2010/0211340 A1 * | 8/2010 | Lowenthal et al. | 702/63 |
| 2010/0211643 A1 * | 8/2010 | Lowenthal et al. | 709/206 |
| 2010/0225475 A1 * | 9/2010 | Karch et al. | 340/540 |
| 2010/0241542 A1 * | 9/2010 | Pinkusevich et al. | 705/34 |
| 2010/0274570 A1 * | 10/2010 | Proefke et al. | 705/1.1 |
| 2010/0315197 A1 * | 12/2010 | Solomon et al. | 340/5.2 |
| 2011/0282535 A1 * | 11/2011 | Woody et al. | 701/22 |

OTHER PUBLICATIONS

International Search Report/Written Opinion, PCT/US2010/027651, Oct. 21, 2010, ISA/KR, Korean Intellectual Property Office, Daejeon, Republic of Korea.

Wang, Yunyan, "Management Information System of Charging Station for Electric Vehicle (EV)," Proceedings of the Eighth International Conference on Electrical Machines and Systems, 2005 ICEMS, vol. 1, 27-29 Sep. 2005, pp. 857-860.

Pratt, Robert G., et al., "Development of a Microprocessor-based, Credit Card Operated, Electric Vehicle Parking/Charging Meter System," Electric Vehicle Council, EVC Expo '83, Oct. 4-6, 1983, pp. 1-9, Detroit, Michigan.

Abella, M. Alonso, et al., "Photovoltaic Charging Station for Electric Vehicles," 2003, Proceedings of 3rd World Conference on Photovoltaic Energy Conversion, May 12-16, 2003, vol. 3, pp. 2280-2283, Osaka, Japan.

C'Connell, Lawrence G., "Infrastructure Considerations for Electric Vehicles," Electric Power Research Institute, No. 921539, Aug. 1992, pp. 1-5.

Coulomb Technologies, "Changing the Way We Get Places," http://www.coulombtech.com/library/chargepoint_appnote.php, Dec. 16, 2009.

The Cost of Generating Electricity, Mar. 2004, The Royal Academy of Engineering, pp. 7-13.

Provisional U.S. Appl. No. 61/144,009, filed Jan. 12, 2009.
Provisional U.S. Appl. No. 61/210,306, filed Mar. 17, 2009.

* cited by examiner

METHOD, SYSTEM, AND APPARATUS FOR DISTRIBUTING ELECTRICITY TO ELECTRIC VEHICLES, MONITORING THE DISTRIBUTION THEREOF, AND/OR CONTROLLING THE DISTRIBUTION THEREOF

RELATED APPLICATION DATA

This application claims the benefit of U.S. Provisional Application Ser. No. 61/161,358, filed Mar. 18, 2009, which is hereby incorporated by reference.

TECHNICAL FIELD

This disclosure relates to electric vehicles, and, more particularly, to a method, system, and apparatus for distributing electricity to electric vehicles, monitoring the distribution thereof, and/or controlling the distribution thereof.

BACKGROUND

Pure electric vehicles and plug-in hybrid electric vehicles are rapidly entering the vehicle transportation marketplace. Discontented with energy prices in general and the damage caused to the environment by conventional combustion chamber vehicle technology, societies around the world are seeking alternatives. These and other factors are transforming the transportation landscape and encouraging the adoption of new and cleaner technologies.

Price efficiencies are playing a role in the adoption of electric vehicles. While battery technologies remain the single largest cost in the production of an electric vehicle, such cost is considerably offset by the price of energy for operating an electric vehicle, which is significantly lower than that of running a conventional gasoline vehicle. For example, in today's prices, to drive an electric vehicle 30 miles costs around $0.60 compared with around $2.00-$3.00 for a gasoline vehicle. Eventually, the cost of batteries will fall because of improved manufacturing efficiencies; as a result, the electric vehicle adoption rate will inevitably increase.

However, one of the challenges with electric vehicle transportation is the ability for electric vehicle users to conveniently recharge their vehicles. Although electric vehicles are four to five times more efficient than gasoline cars, they suffer from a lack of infrastructure that effectively limits how far they can travel. This can discourage the wider public from adopting electric vehicle technologies.

Early adopters of electric vehicles are generally conscious of the environment. They are aware of the severe damage to the planet caused by some types of energy sources. They might seek to reduce their own carbon footprint by closely monitoring energy consumption, particularly as a result of their own transportation needs. An awareness of the various sources of energy and related energy consumption statistics are areas of interest for such owners. For example, electric vehicle owners might be concerned that electricity being used to charge their own electric vehicle originates from a coal-fired power plant rather than a windmill farm. Access to knowledge about the sources and amounts of electricity would be valuable and worthwhile to such vehicle owners, and could lead to improved driving habits.

Some current owners of conventional gasoline powered vehicles might be inclined to change to a more environment-friendly vehicle if the change were incentivized in some manner. Perceptions exist that electric vehicles are inferior, particularly in terms of performance. Access to charging stations is limited. Still others believe that only those who can afford the newer and cleaner technologies can make the change to electric. Such barriers could be removed with a system accessible to all members of society, especially one that encourages efficient and affordable vehicle-recharging access to everyday drivers.

Unfortunately, no such infrastructure is available to vehicle owners today. Greater numbers of charging locations for vehicles to recharge quickly and affordably could mean lower costs by reducing battery payloads, and would broaden the range of travel. Nevertheless, there are challenges related to providing secure, accessible, and affordable, yet profitable, distribution of electricity to electric vehicles. Challenges also remain for monitoring and controlling the distribution of electricity to electric vehicles.

Accordingly, a need remains for a method, system, and apparatus for distributing electricity to electric vehicles, monitoring the distribution thereof, and/or controlling the distribution thereof. Embodiments of the invention address these and other limitations in the prior art.

The foregoing and other features of the invention will become more readily apparent from the following detailed description, which proceeds with reference to the accompanying drawings.

DETAILED DESCRIPTION

Figure 1:
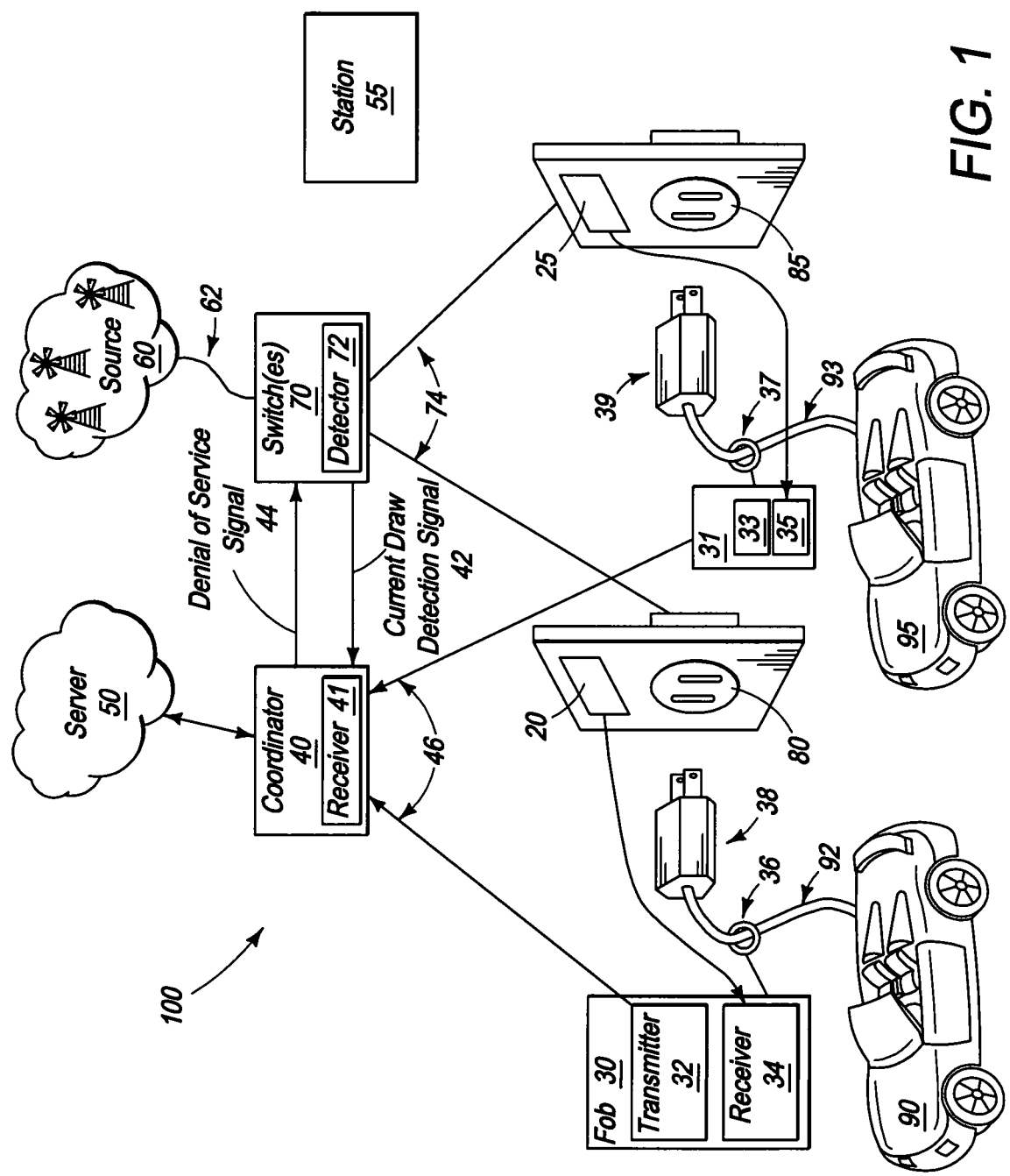
FIGS. 1 and 1A illustrate a system including various components and information related to an electric-vehicle charging infrastructure, such as components to monitor and control the distribution of electricity to electric vehicles according to one example embodiment of the invention.
Figure 1A:
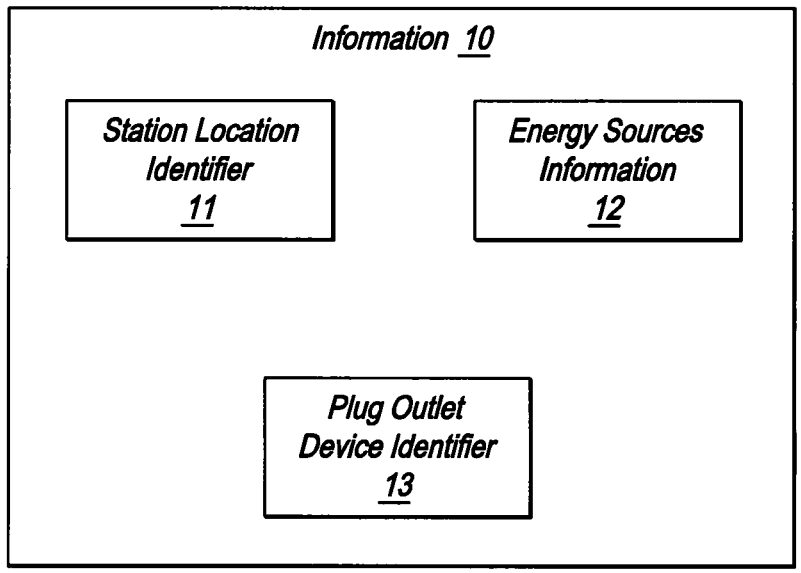
Figure 1A:
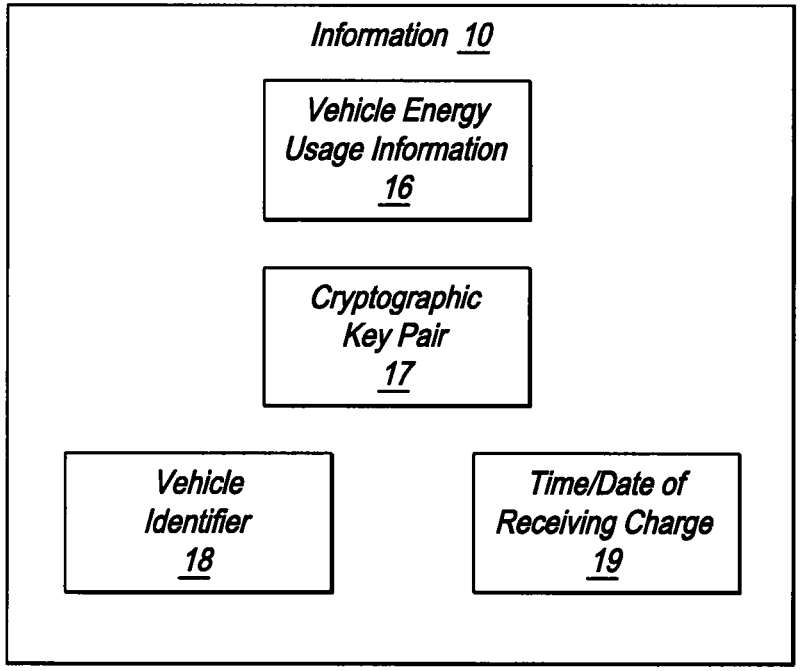

FIGS. 1 and 1A illustrate a system 100 including various components and information related to an electric-vehicle charging infrastructure, such as components to monitor and control the distribution of electricity to electric vehicles according to one example embodiment of the invention. The system 100 is generally directed toward a "pay" model where operators or owners of electric vehicles are inclined to pay money, or otherwise compensate station owners and/or electricity providers, for charging their vehicles. The system 100 also prevents unauthorized individuals or vehicles from misappropriating electricity.

More particularly, one or more plug outlet devices, such as 80 and 85, are associated with a station 55. While two plug outlet devices 80 and 85 are shown, it should be understood that one or any number of plug outlet devices fall within the scope of this disclosure. The station 55 can include various forms and be located at any place such as a traditional gasoline station, a specialized electric vehicle charging station, a parking garage, a home, an apartment complex, a workplace, or a vehicle fleet charging location, among other possibilities. The station 55 can include the plug outlet devices 80 and 85, the switch component 72, and the coordinator element 40, or otherwise be associated therewith. The term "station" should be construed broadly to include any provider of electric vehicle charging services, whether for profit or not-for-profit, public or private, large or small. Moreover, while often referred to herein as "electric vehicles," such vehicles can include plug-in hybrid vehicles, pure electric vehicles, or any one of a variety of vehicles that operate or move using at least some electricity.

The plug outlet devices 80 and 85 can include various features such as a two or three-prong plug outlet, and electrical conductors 74 connecting the plug outlet devices to the switch component 70. While the figures show example embodiments of the plug outlet devices 80 and 85, these can include various different forms, shapes, and various additional components, whether or not specifically illustrated in the figures. The switch component 70 is "normally-closed" and operatively associated with the plug outlet device 80 and 85. The term "normally-closed" means that the switch component 70 normally connects a source of electricity 60 to the plug outlet devices 80 and 85 so that owners or operators of electric vehicles, generally referred to herein simply as "operators," can cause their vehicles to receive a charge from the source of electricity 60.

The switch component 70 can include one or more switches. Preferably, each plug outlet device 80 and 85 has an associated switch in the switch component 70. Alternatively, the plug outlet devices 80 and 85 can each include a switch rather than the separate switch component 70. The source of electricity 60 is coupled to the switch component 70 over conductor 62. Preferably, the source of electricity 60 includes an environment friendly source of electricity, such as wind or solar power, although any and all sources of electricity fall within the scope of this disclosure.

Each of the plug outlet devices, such as 80 and 85, include information 10 (of FIG. 1A) about the station 55. For example, the information 10 about the station 55 may be stored in a station identifier (ID) tag, such as tags 20 and 25. The station ID tag can include, for example, a radio frequency identifier (RFID) tag, an infrared emitter, an optical emitter, or a radio signal generator, among other suitable emitters or transmitters. Generally, the station ID tags 20 and 25 are configured to transmit the information 10 about the station 55 toward one or more electric vehicles, such as 90 and 95. The information 10 about the station 55 can include, for example, a station location ID 11, a plug outlet device ID 13, or energy sources information 12, among other possibilities.

The station ID tags can each include an autonomous tag, such as 20 and 25, that is configured to transmit the information 10 about the station 55 at predefined time intervals. Alternatively, the station ID tags can each include a presence-sensor, such as 20 and 25, to sense a presence of the vehicles 90 or 95 and transmit the information 10 about the station 55 toward the vehicles responsive to the sensed presence, thereby conserving power. For example, the presence-sensor may sense a presence of the vehicles using a conductive sensor, infrared (IR) sensor, or motion sensor, among other suitable sensors. Nevertheless, the station ID tags need not receive data or indicia from the vehicles 90 or 95.

Each of the vehicles 90 and 95 can include a power cord such as 92 and 93 coupled to the vehicle, and a plug adapter such as 38 and 39 for plugging into the plug outlet devices 80 and 85, respectively. Although the terms "cord" and "power cord" are frequently used herein, such terms can include any type of conductor, and/or may include a protective element around the conductor. A fob, such as 30 and 31, may be attached to the respective power cords, or otherwise associated with a vehicle, and may receive the information 10 about the station 55 from at least one of the respective station ID tags 20 or 25. The station ID tags may be configured to unidirectionally transmit the information 10 about the station 55 to the fob. For example, the fob 30 may include receiver 34 and the fob 31 may include receiver 35. The receivers 34 and 35 may receive the information 10 about the station 55, such as the station location ID 11, from the station ID tags 20 or 25, and may store such station information in the corresponding fob.

Each fob 30 and 31 may be coupled to a corresponding sensors, such as 36 and 37, which can include current or voltage sensors, to sense an amount of electrical current or energy received from the corresponding plug outlet device 80 or 85. In addition, each fob 30 and 31 can store information 15 (of FIG. 1A) about the corresponding vehicle 90 and 95. For example, the information 15 about the vehicle can include vehicle energy usage information 16, such as the amount of electrical current or energy received from the corresponding plug outlet device 80 or 85. In addition, the information 15 about the vehicle may include a cryptographic key pair 17 identifying the owner or operator of the vehicle, a vehicle identifier (ID) 18, or the time or date 19 of receiving the electrical charge, among other possibilities.

Transmitters, such as 32 and 33, included in the fobs 30 and 31, respectively, can transmit the information 15 about the vehicles 90 and 95, respectively, and the information 10 about the station 55 to a receiver 41 of a coordinator element 40. In other words, the coordinator element 40 receives the vehicle information 15 and the information 10 about the station 55 from the vehicles, in particular, from the fobs 30 and 31 that are attached to the vehicles. Preferably, the coordinator element 40 wirelessly receives such information. In one embodiment, the coordinator element 40 is a computer that is proximally located to the plug outlet devices 80 and 85, and also to the vehicles 90 and 95 when they are parked near the plug outlet devices 80 and 85. As a result, the wireless connection between the fobs 30 and 31 and the coordinator element 40 can use short-distance wireless connections, such as infrared, optical, or short-range radio technologies.

The coordinator element 40 may be operatively associated with the switch component 70. For example, the coordinator element 40 can cause the normally-closed switch component to open and disconnect the source of electricity 60 from at least one of the plug outlet devices 80 and 85 responsive to a presence or absence of wireless signal(s) 46. The wireless signal(s) 46 can include the information (e.g., 10, 15) transmitted from at least one of the fobs 30 and 31 to the coordinator element 40, which can detect the presence or absence of the wireless signal(s) 46 and verify the information contained therein. Specifically, the coordinator element 40 may receive the wireless signal(s) 46 from any of the transmitters 32 and 33 of the fobs 30 and 31.

In addition to verifying the presence of the wireless signal(s) 46, the coordinator element 40 can also verify the vehicle information 15 or the information 10 about the station 55. For example, the coordinator element 40 can transmit such information (e.g., 10, 15) to one or more remote computer servers 50 for verification. The remote computer server 50 is operatively coupled to the coordinator element 40 over a network, and may store such information when it is received. The network can include a local area network (LAN), a wide area network (WAN), the Internet, a wireless network, a satellite communication network, among other suitable networks. When the coordinator element 40 determines that the vehicle information 15 or information 10 about the station 55 is invalid, or otherwise fails to verify such information with the remote computer server 50, the coordinator element 40 can transmit a denial of service signal 44 to the switch component 70.

More specifically, the remote computer server 50 may determine that the information (e.g., 10, 15) or some portion of the information is invalid; for example, when the information does not correlate with a valid or sufficiently funded account associated with the vehicle, or if some portion of the information such as the cryptographic key pair is invalid, the information may fail verification. Upon failure of the verification, the coordinator element 40 sends the denial of service signal 44 to the switch component 70 and the normally-closed switch component 70 opens and disconnects the source of electricity 60 from at least one of the plug outlet devices 80 or 85, or otherwise disables the plug outlet device, responsive to the denial of service signal 44. The denial of service signal 44 can include the plug outlet device ID 13 so that the switch component 70 can determine which plug outlet device to disable.

The coordinator element 40 can also transmit the denial of service signal 44 in the absence of a fob (not shown). In other words, if a vehicle operator attempts to draw a charge or current from one of the plug outlet devices, and does not have a fob to proceed with authorized charging of the vehicle, the system can manage such a scenario as follows. A detector 72, which may be included in the switch component 70, can sense an electrical current draw from one of the plug outlet devices 80 or 85. In other words, when a vehicle is plugged into one of the plug outlet devices, current will begin to be drawn from the source of electricity 60, and the detector 72 can detect the same.

The switch component 70 generates a current draw detection signal 42, which is transmitted to the coordinator element 40. When the coordinator element 40 receives the current draw detection signal 42, it can check for a presence or absence of a wireless signal 46 from one of the vehicles. In the absence of the wireless signal 46, and responsive to the current draw detection signal 42, the coordinator element 40 can transmit a denial of service signal 44 to the switch component 70. Moreover, if the wireless signal 46 is present when the current draw detection signal 42 is received, the coordinator element 40 can verify the vehicle information 15 or information 10 about the station 55 responsive to the current draw detection signal 42. The denial of service signal 44 can cause the switch component 70 to disable a corresponding plug outlet device, as previously discussed. Therefore, unauthorized vehicle operators are prevented from charging their vehicles.

Figure 2:
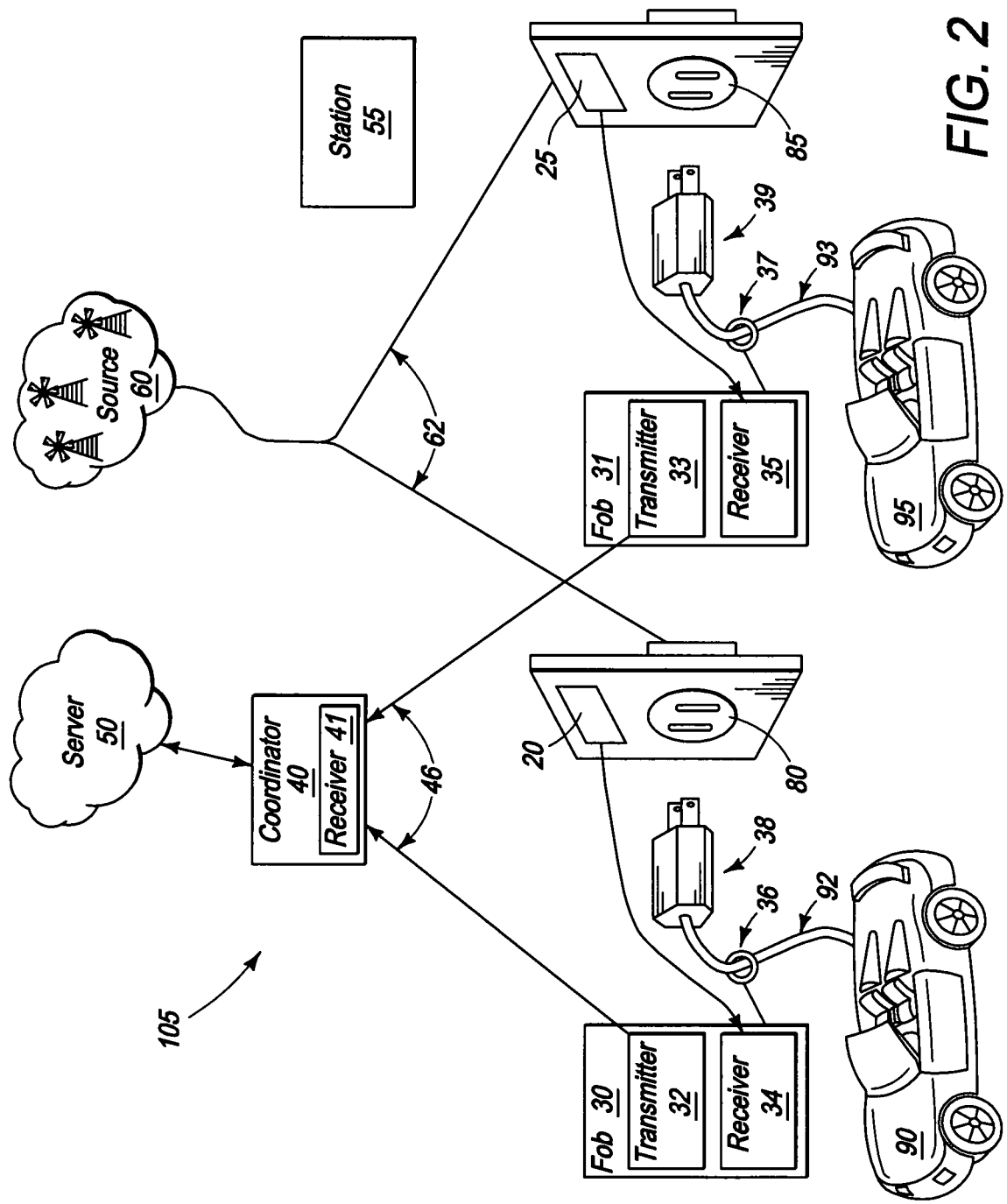
FIG. 2 illustrates another system including various components related to an electric-vehicle charging infrastructure, such as components to monitor the distribution of electricity to electric vehicles according to another example embodiment of the invention.

FIG. 2 illustrates another system 105 including various components related to an electric-vehicle charging infrastructure, such as components to monitor the distribution of electricity to electric vehicles according to another example embodiment of the invention. The system 105 is generally directed toward a "free" model, sometimes referred to as a "no charge" model, where operators or owners of electric vehicles are not inclined to pay money, and may even need to be incentivized to charge their vehicles using such an infrastructure. This is particularly useful for early adopters of electric vehicles. Moreover, the system 105 can spur the adoption of an electric vehicle charging infrastructure, such as the one disclosed herein, and provide useful monitoring of the distribution of electricity to vehicle operators and/or station owners. Notably, the "free" or "no charge" model can "overlay" any current charging infrastructures or stations, which can be "upgraded" to use various embodiments of the present invention. Although the system 105 is generally referred to as the "free" or "no charge" model, that is not to suggest that no revenue can be generated. For example, information about the various aspects of the distribution of electricity to electric vehicles itself has value.

Many of the components illustrated in FIG. 2 correspond to similar components of FIG. 1, and for the sake of brevity, a detailed description of such components will not be repeated. While many of the components remain, such as the plug outlet devices 80 and 85, and the coordinator 40, etc., some components need not be included, such as the switch component 70. As a result, operators of vehicles 90 and 95 can access plug outlet devices 80 or 85 without any specific authorization or verification. Nevertheless, the operators may be incentivized, or otherwise have a desire, to use fobs such as 30 and 31 when receiving a charge for their vehicles.

For example, reports based on vehicle energy usage, station energy usage, energy sources information, or station location information, can be aggregated and displayed to either the vehicle operators or the station owners, as will be described in detail below. Such information can inform the vehicle operators and station owners about the overall aspects of their transportation-related energy usage, and can help alter behaviors in favor of improving the environment or energy conservation. Moreover, knowing one's "carbon footprint" and related information can be useful and informative to the vehicle operator or station owner, and having and sharing such information may further one's reputation.

In system 105, the source of electricity 60 is coupled to the plug outlet devices 80 and 85 over conductor 62. The vehicles such as 90 and 95 can plug into plug outlet devices 80 and 85 and immediately begin receiving a charge. The fobs 30 or 31 may operate in a manner similar to or the same as that described above by transmitting information such as vehicle information 15 and information 10 about the station 55 to the coordinator element 40. The coordinator element 40 can transmit such information to the remote computer server 50, which can aggregate and/or store such information for later display.

Figure 2A:
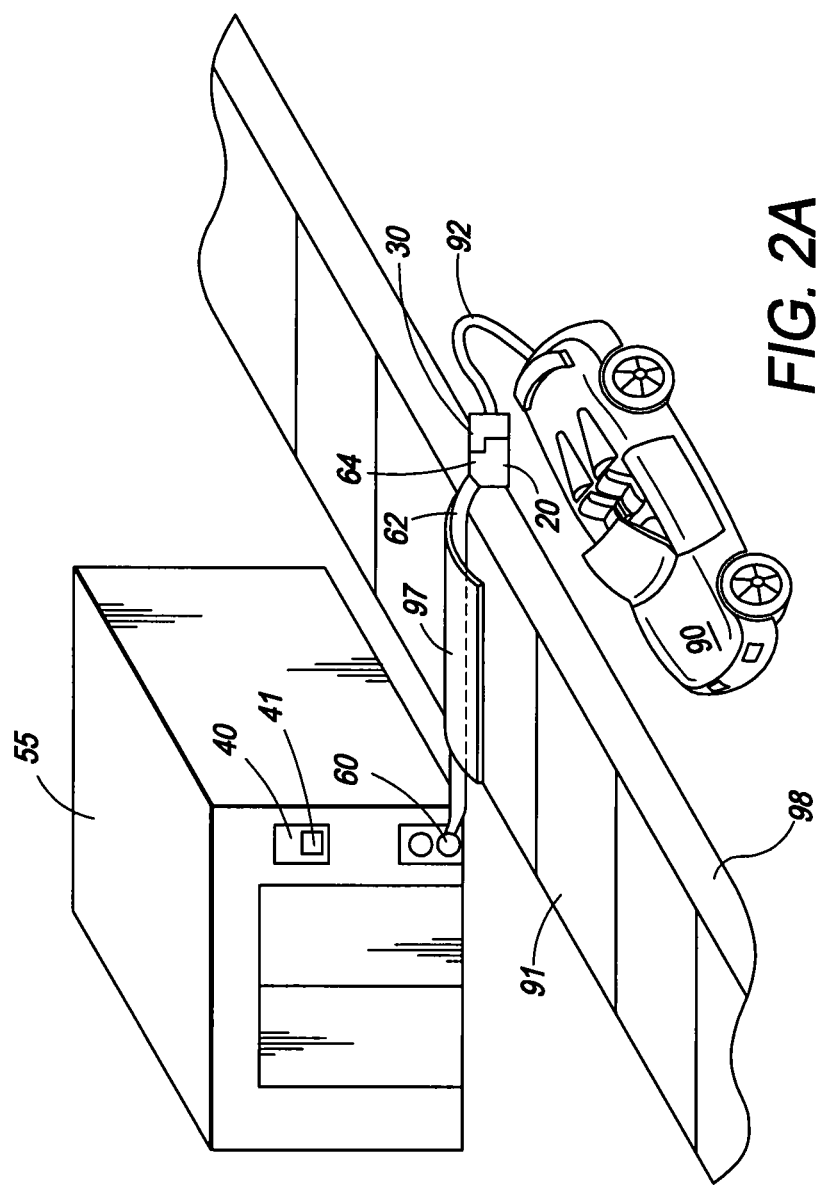
FIG. 2A illustrates an example configuration of components similar to those of FIG. 2.

FIG. 2A illustrates an example configuration of components similar to those of FIG. 2. The station 55 can be located close to a sidewalk 91 or curb 98. For example, in cities or in front of homes, vehicles can be parked next to a sidewalk or curb. Alternatively, vehicles can be parked in rows of spaces associated with a garage, an apartment complex, a special event center, a parking lot, or other suitable parking locations. Embodiments of the present invention can be implemented or associated with any such arrangement or complex.

In one example, the vehicle is parked next to the sidewalk 91 or curb 98. The curb 98 need not be located next to the sidewalk 91. Here, a cord 62 couples the source of electricity 60 to the plug adapter 64. The plug adapter 64 can include station ID tag 20, which includes capabilities similar to or the same as the station ID tag 20 previously described. The plug adapter 64, including the station ID tag 20, can be coupled to the plug adapter/fob 30, which is in turn coupled to the electric vehicle 90 via cord 92. The plug adapter/fob 30 can communicate with the plug adapter 64, the station ID tag 20, the coordinator element 40, or the remote computer server 50, as previously discussed in detail above.

The station 55 is illustrated as a physical building in FIG. 2A, including the coordinator element 40, the receiver 41, and the source of electricity 60. In other embodiments, the station 55 includes a general location with different components located proximally to the building but not necessarily attached to or in the building.

A protective cover 97 can be disposed over the cord 62 to protect pedestrians from tripping over or otherwise contacting the cord 62. The protective cover 97 can be made of a flexible durable material, such as rubber, that conforms to the shape of the cord 62. Alternatively, the protective cover 97 can be made of a rigid durable material, such as metal or plastic, or any other suitable material. The protective cover 97 can also draw attention to the station 55 or the cord 62 so that pedestrians or other individuals are aware of the presence of these components. Moreover, the protective cover 97 can include advertisements that tout the availability of electric vehicle charging services, sponsorship information, or other suitable advertisements. Preferably, the protective cover 97 is securely fixed to the sidewalk 91 or curb 98. While the cord 62 is shown extending over the sidewalk 91 and curb 98, it should be understood that the cord 62 can instead be completely or partially buried in the ground between the source 60 and the plug adapter 64. In addition, while a single cord 62 and plug adapter 64 are illustrated in FIG. 2A, it should be understand that any number of cords 62 can be coupled to the source 60 of the station 55, thereby providing electric vehicle charging services to any number of electric vehicles simultaneously. The capabilities and features of the components discussed above with reference to FIGS. 1, 1A, and 2 can also apply to the example configuration of components illustrated in FIG. 2A.

Figure 3:
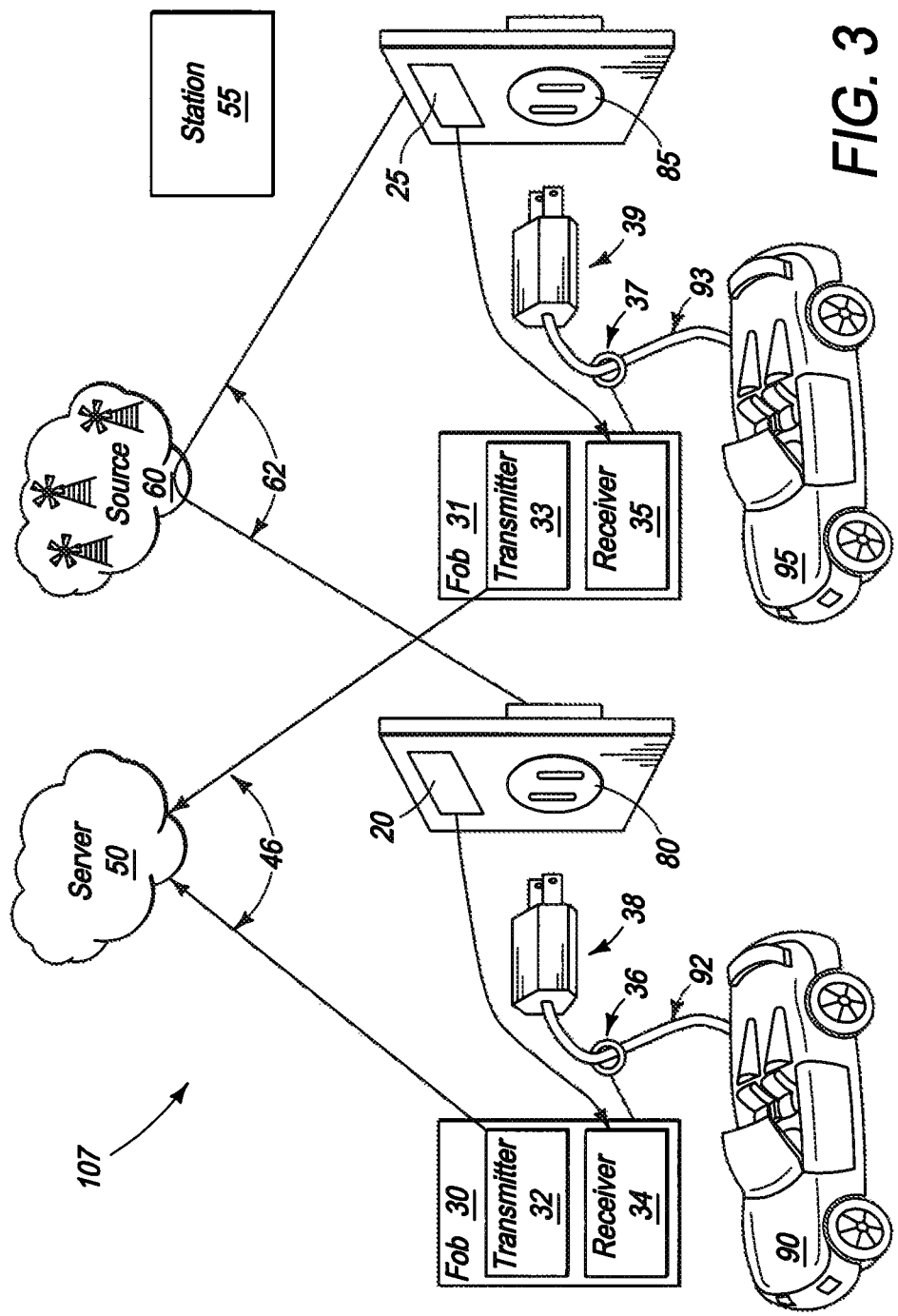
FIG. 3 illustrates yet another system including various components related to an electric-vehicle charging infrastructure, such as components to monitor the distribution of electricity to electric vehicles according to yet another example embodiment of the invention.

FIG. 3 illustrates yet another system 107 including various components related to an electric-vehicle charging infrastructure, such as components to monitor the distribution of electricity to electric vehicles according to yet another example embodiment of the invention.

The system 107 is also generally directed toward a "free" or "no charge" model where operators or owners of electric vehicles are not inclined to pay money, and may even need to be incentivized to charge their vehicles. Again, this is particularly useful for early adopters of electric vehicles, or to spur the adoption of an electric vehicle charging infrastructure, such as the one disclosed herein. As previously suggested, although the systems 105 and 107 are generally referred to as the "free" or "no charge" model, revenue can still be generated by the station owners, energy providers, or other entities monitoring, or otherwise managing or displaying, information about the distribution of electricity.

Many of the components illustrated in FIG. 3 correspond to similar components of FIG. 1, and for the sake of brevity, a detailed description of such components will not be repeated. While some of the components remain, such as the plug outlet devices 80 and 85, etc., most of the components mentioned in FIG. 1 need not be included, such as the switch component 70 and the coordinator element 40. As a result, operators of vehicles 90 and 95 can access plug outlet devices 80 or 85 without any specific authorization or verification. Nevertheless, the operators may be incentivized, or otherwise have a desire, to use fobs such as 30 and 31 when receiving a charge for their vehicles.

In system 107, the source of electricity 60 is coupled to the plug outlet devices 80 and 85 over conductor 62. The vehicles such as 90 and 95 can plug into plug outlet devices 80 and 85 and immediately begin receiving a charge. The fobs 30 or 31 can transmit information such as vehicle information 15 and information 10 about the station 55 directly to the remote computer server 50, thereby bypassing the coordinator element 40. The remote computer service can then aggregate and/or store such information for later display. In this embodiment, the fobs 30 and 31 can use long-range wireless connections to transmit wireless signal(s) 46, such as over a cellular network, Worldwide Interoperability for Microwave Access (WiMAX®) network, wireless local area network (WLAN), or WI-FI® network, among other suitable networks.

FIGS. 4-8 illustrate alternative configurations of some of the components of the systems of FIGS. 1-3, according to some embodiments of the invention. Generally, having a close proximity of the fob, such as 30, to the station ID tag, such as 20, improves a communication link and reduces a chance for communication errors. The communication link between 30 and 20 can include a short-distance wireless technology as discussed above, or a conductive link.

Figure 4:
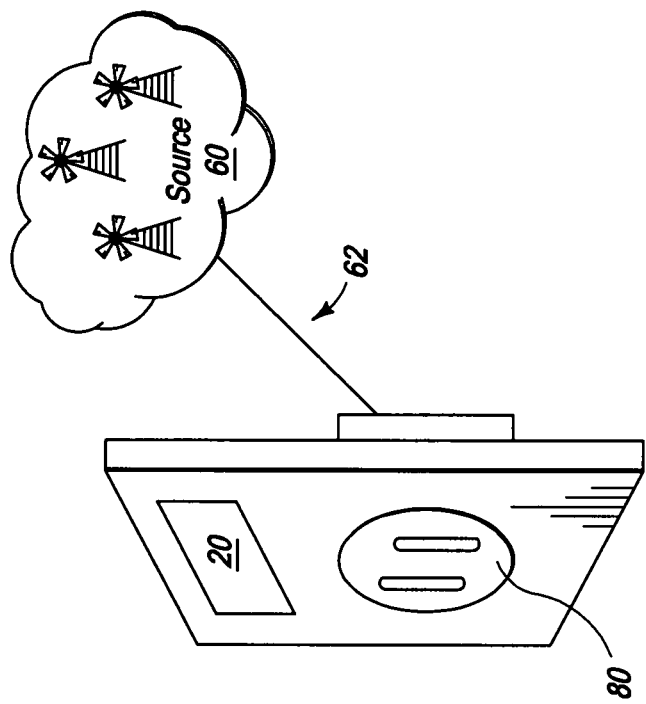
FIGS. 4-8 illustrate alternative configurations of some of the components of the systems of FIGS. 1-3, according to some embodiments of the invention.
Figure 4:
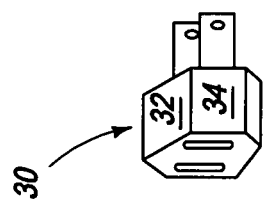
Figure 4:
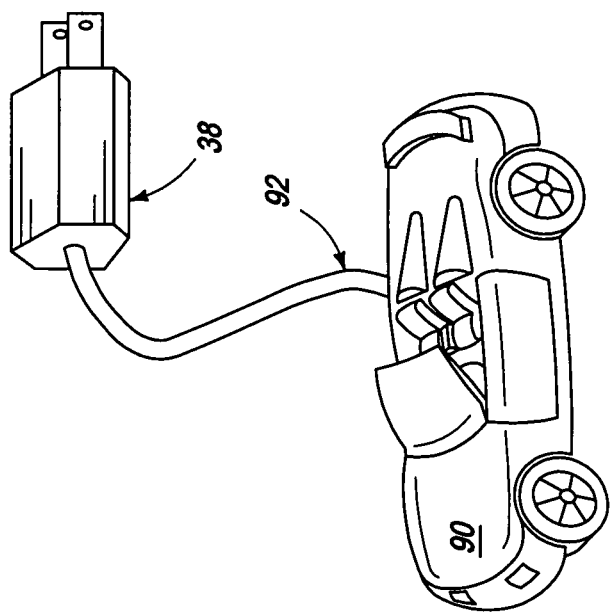

FIG. 4 shows a combined plug adapter and fob 30. The plug adapter/fob 30 includes the transmitter 32 and receiver 34 as previously described, and can also include, for example, the sensor 36 of FIG. 1. In this embodiment, the plug adapter/fob 30 is portable and can be attached to the plug adapter 38 or power cord 92, which are coupled to the vehicle 90. The plug adapter/fob 30 can communicate with the plug outlet device 80, the station ID tag 20, the coordinator element 40, or the remote computer server 50, as previously discussed in detail above. The plug outlet device 80 can be coupled directly to the source of electricity 60 via cord 62, or to the switch component 70 (of FIG. 1).

Figure 5:
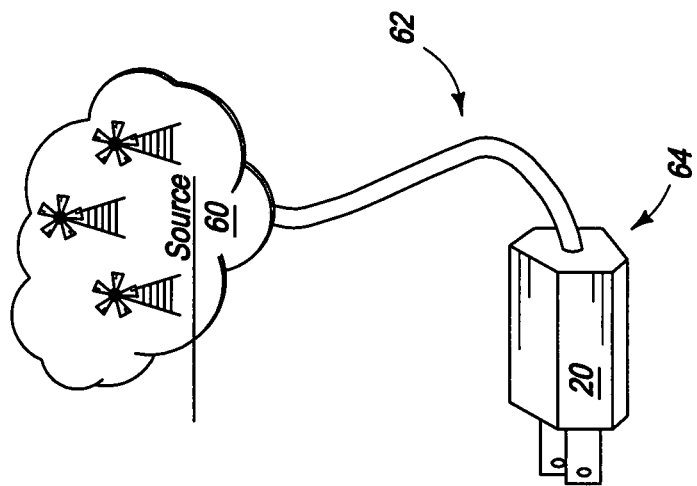
Figure 5:
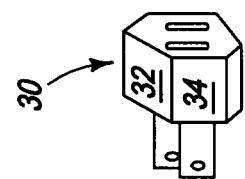
Figure 5:
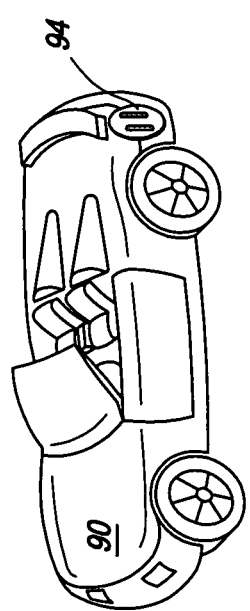

FIG. 5 shows a combined plug adapter and fob 30. Also illustrated is a combined plug adapter and station ID tag 20. The plug adapter/fob 30 includes the transmitter 32 and receiver 34, and other capabilities, as previously described. The plug adapter/fob 30 can also include, for example, the sensor 36 of FIG. 1. The plug adapter 64 includes station ID tag 20, which includes capabilities similar to or the same as the station ID tag 20 previously described. In this embodiment, the plug adapter/fob 30 is portable and can be attached to a plug inlet 94 of the vehicle 90. The plug adapter 64 can be coupled directly to the source of electricity 60 via cord 62, or to one of the plug outlet devices (of FIG. 1), or to the switch component 70 (of FIG. 1). The plug adapter 64, including the station ID tag 20, can also be coupled to the plug adapter/fob 30. The plug adapter/fob 30 can communicate with the plug outlet device 80, the plug adapter 64, the station ID tag 20, the coordinator element 40, or the remote computer server 50, as previously discussed in detail above.

Figure 6:
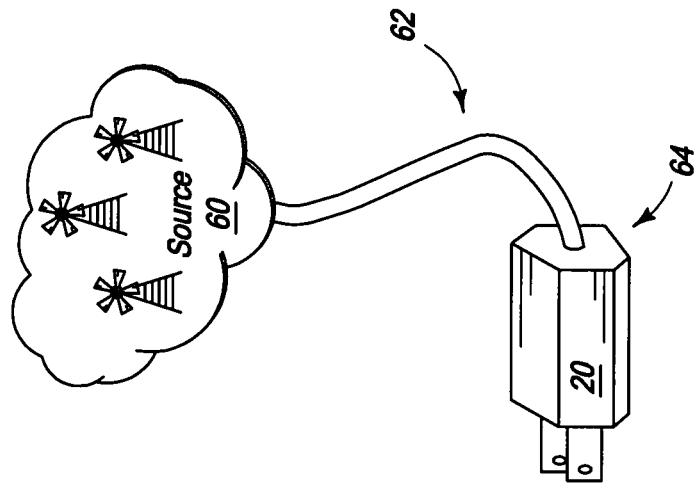
Figure 6:
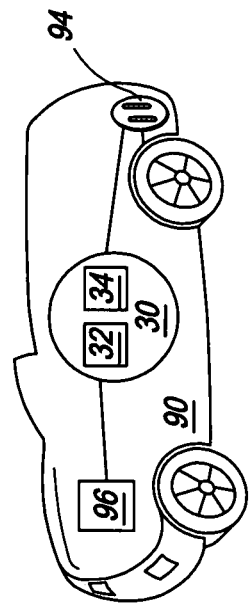

FIG. 6 shows vehicle 90 having the fob 30 located within the vehicle. Also illustrated is a combined plug adapter and station ID tag 20. The fob 30 includes the transmitter 32 and receiver 34, and other capabilities, as previously described. In addition, the fob 30 can be connected inline between the plug inlet 94 and battery 96, and can include, for example, the sensor 36 of FIG. 1. The plug adapter 64 includes the station ID tag 20, which also includes capabilities similar to or the same as the station ID tag 20 previously described. In this embodiment, the plug adapter/fob 30 is generally fixed to or otherwise part of the vehicle. The plug adapter 64 can be coupled directly to the source of electricity 60 via cord 62, or to one of the plug outlet devices (of FIG. 1), or to the switch component 70 (of FIG. 1). The plug adapter 64 can be coupled to the plug inlet 94 of the vehicle 90. The plug adapter/fob 30 can communicate with the plug outlet device 80, the plug adapter 64, the station ID tag 20, the coordinator element 40, or the remote computer server 50, as previously discussed in detail above.

Figure 7:
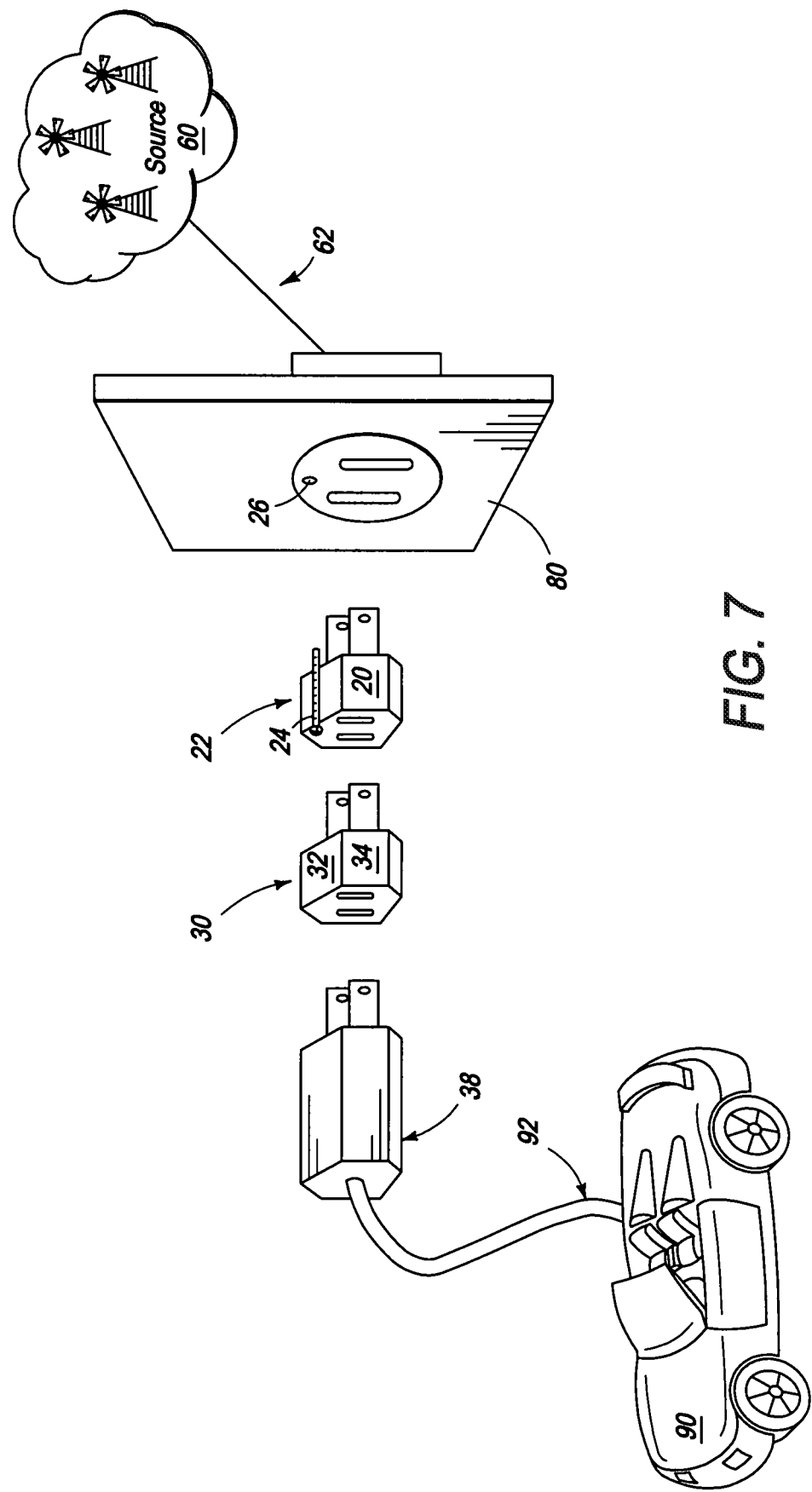

FIG. 7 shows a combined plug adapter and fob 30. The plug adapter/fob 30 includes the transmitter 32 and receiver 34 as previously described, and can also include, for example, the sensor 36 of FIG. 1. In this embodiment, the plug adapter/fob 30 is portable and can be attached to the plug adapter 38 or power cord 92, which are coupled to the vehicle 90.

Conversely, the plug adapter 22, which includes the station ID tag 20, can be initially separate from the plug outlet device 80, and then substantially permanently secured to the plug outlet device 80. For example, a tamper-resistant screw 24 can securely attach the plug adapter 22 to the hole 26 of the plug outlet device 80. Other permanent attaching means can be used such as glue or welding, etc. This provides the ability for station owners to "upgrade" their plug outlet devices by attaching the plug adapter 22 to their plug outlet device.

The plug adapter/fob 30 can communicate with the plug outlet device 80, the plug adapter 22, the coordinator element 40, or the remote computer server 50, as previously discussed in detail above. The plug outlet device 80 can be coupled directly to the source of electricity 60 via cord 62, or to the switch component 70 (of FIG. 1).

Figure 8:
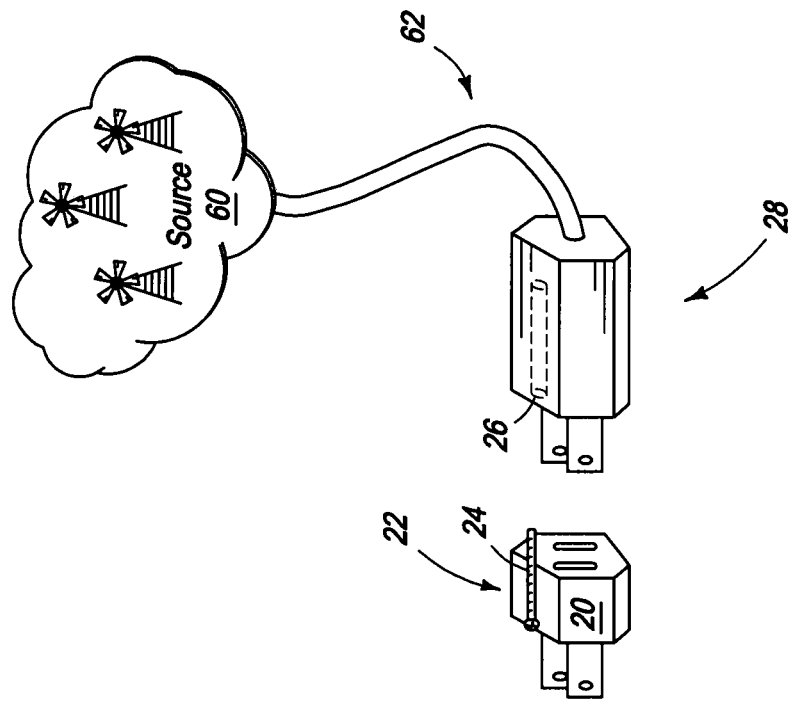
Figure 8:
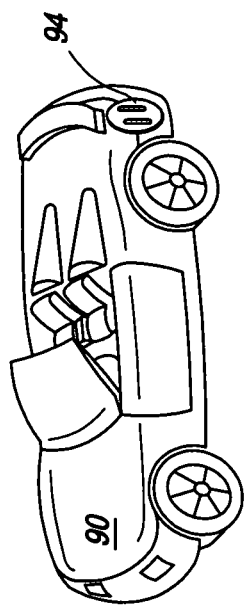

FIG. 8 shows a combined plug adapter and fob 30. Also illustrated is the plug adapter 22, which includes the station ID tag 20, and can be initially separate from the plug adapter 28, and then substantially permanently secured to the plug adapter 28. For example, a tamper-resistant screw 24 can securely attach the plug adapter 22 to the hole 26 of the plug adapter 28. Other permanent attaching means can be used such as glue or welding, etc. This provides the ability for station owners to "upgrade" their plug outlet devices by attaching the plug adapter 22 to their plug adapter 28. The plug adapter 22 includes capabilities similar to or the same as the station ID tag 20 previously described.

The plug adapter/fob 30 includes the transmitter 32 and receiver 34, and other capabilities, as previously described. In this embodiment, the plug adapter/fob 30 is portable and can be attached to a plug inlet 94 of the vehicle 90. The plug adapter/fob 30 can also include, for example, the sensor 36 of FIG. 1. The plug adapter 22 can be coupled to the source of electricity 60 via the plug adapter 28 and the cord 62, or to one of the plug outlet devices (of FIG. 1), or to the switch component 70 (of FIG. 1). The plug adapter 22 can also be coupled to the plug adapter/fob 30. The plug adapter/fob 30 can communicate with the plug outlet device 80, the plug adapter 22, the coordinator element 40, or the remote computer server 50, as previously discussed in detail above.

Figure 9:
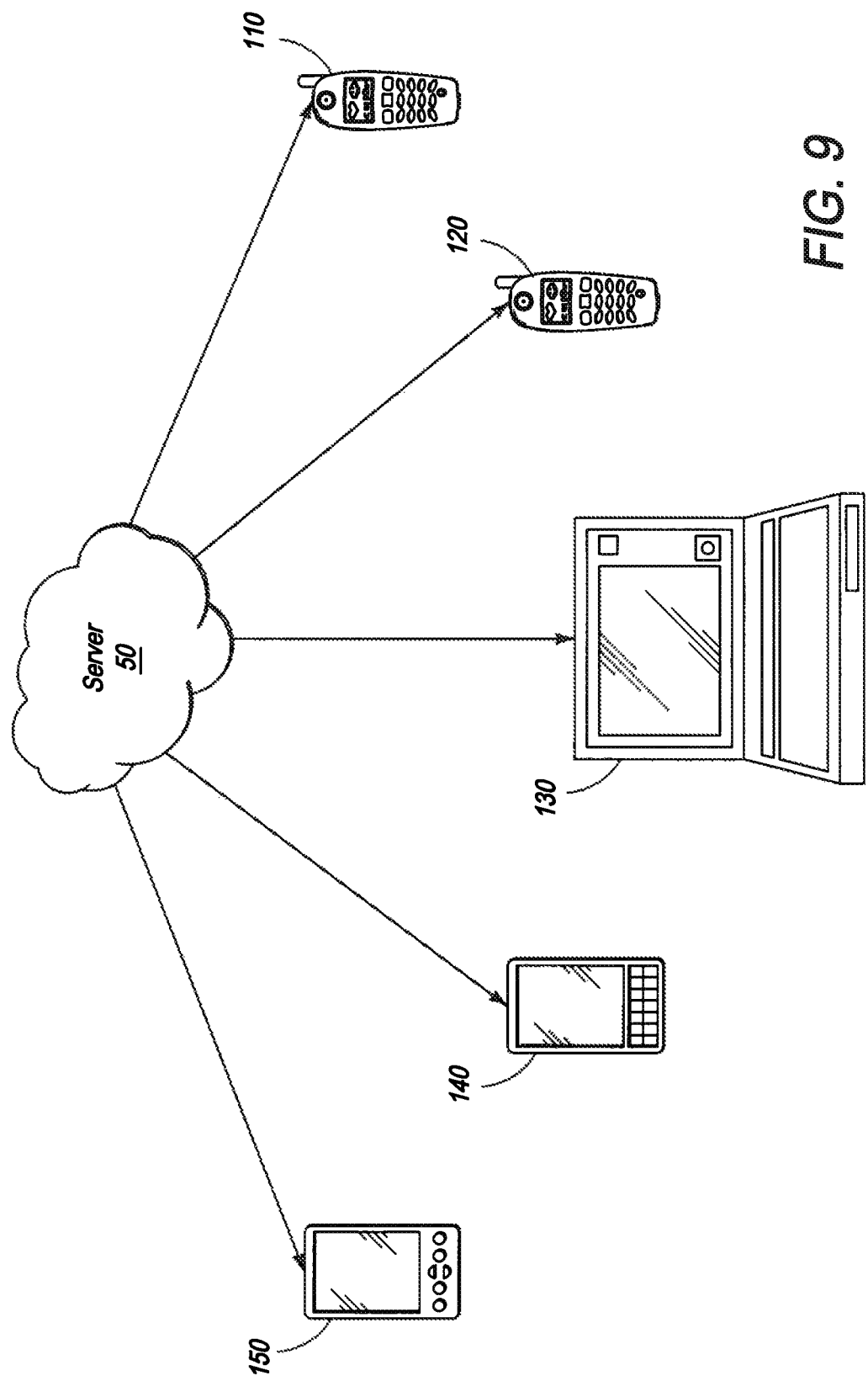
FIGS. 9-11 illustrate additional inventive aspects of the systems illustrated in FIGS. 1-8.
Figure 10:
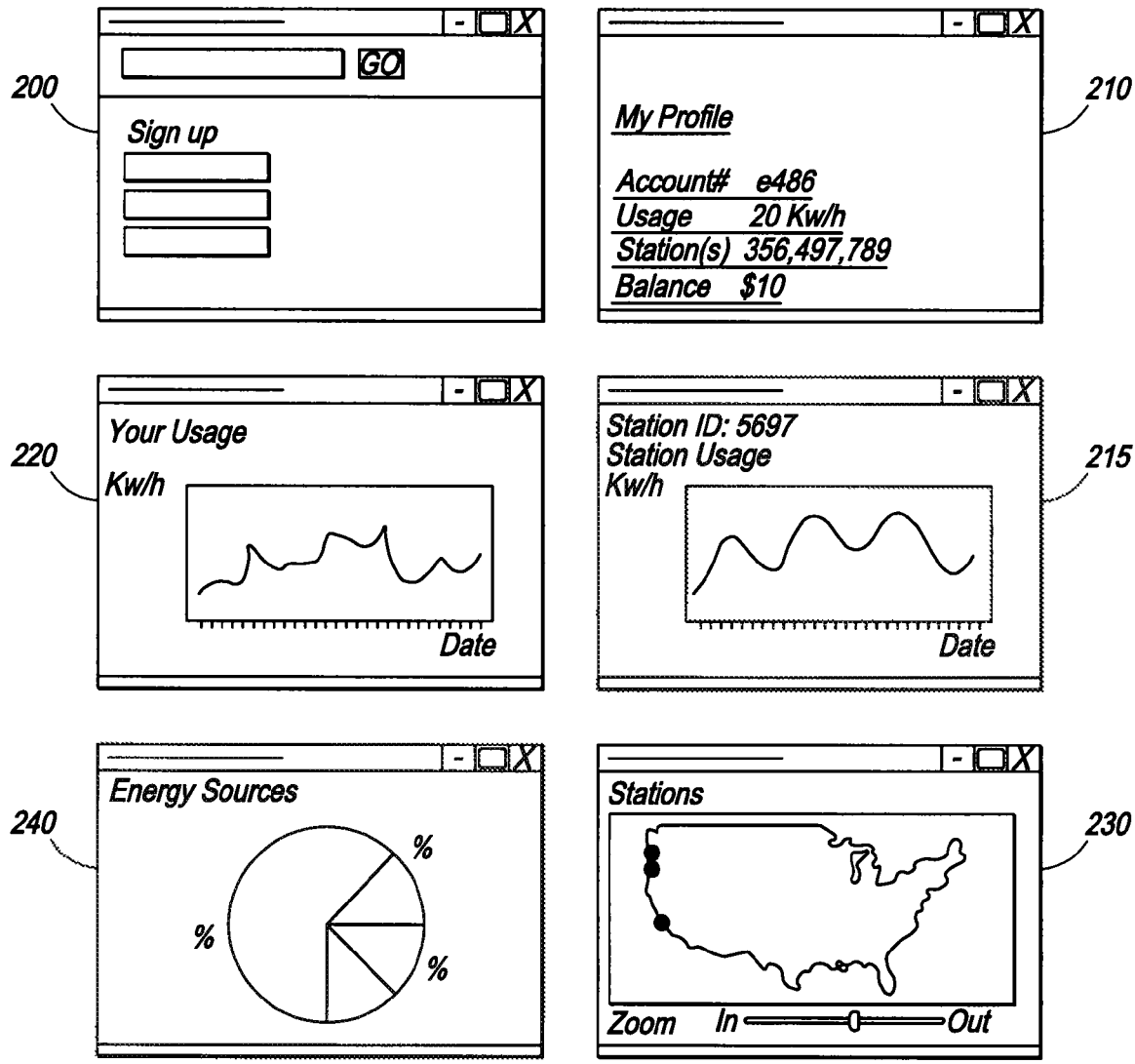
Figure 11:
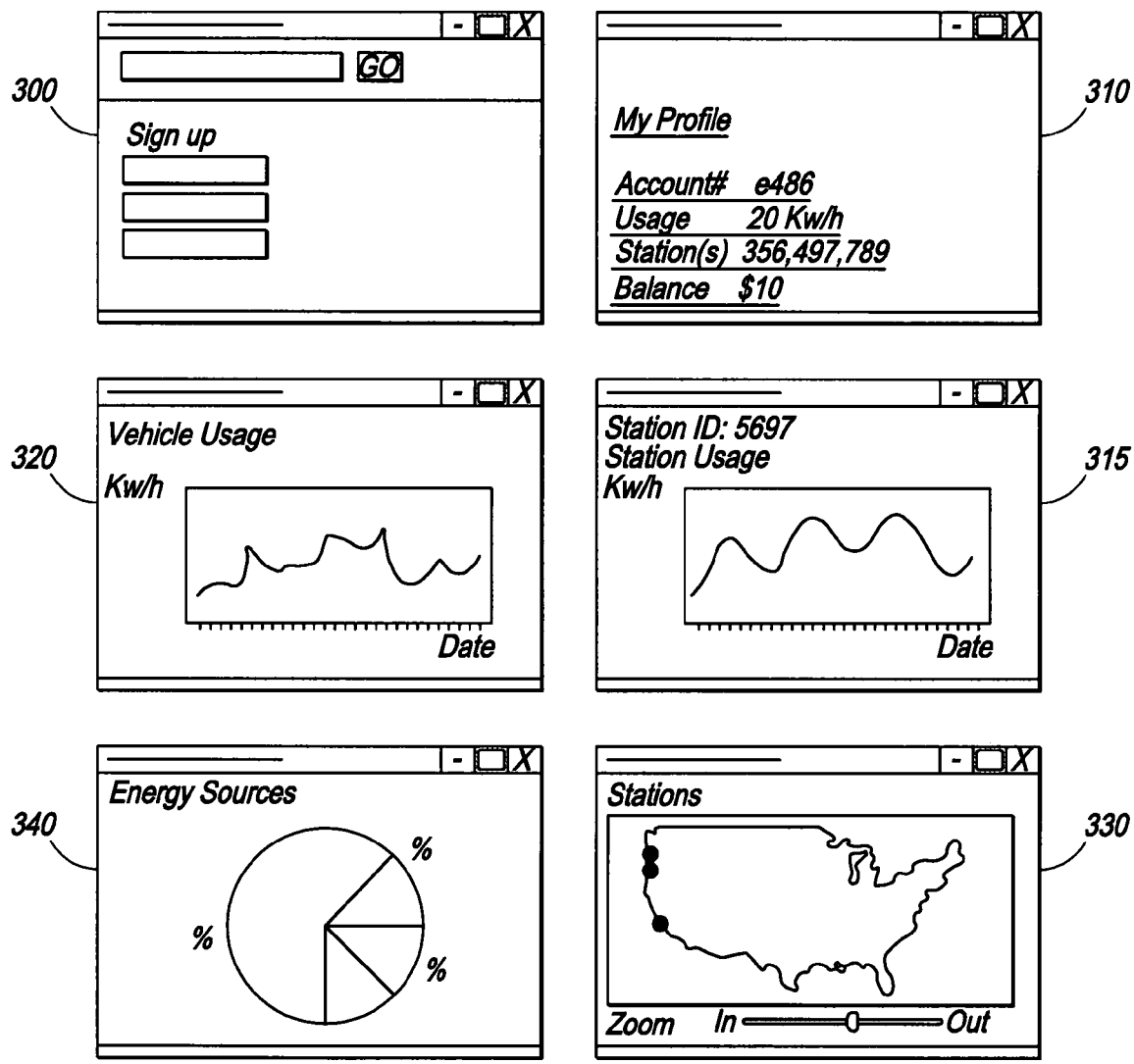

FIGS. 9-11 illustrate additional aspects of the systems illustrated in FIGS. 1-8. FIG. 9 illustrates the computer server 50 of FIG. 1, including additional connections to various computing devices. FIG. 10 illustrates various reports and displays of information, including different sections of a web site for receiving registration information from a vehicle operator and/or reports for displaying aggregated information to the vehicle operator. FIG. 11 illustrates various reports and displays of information, including different sections of a web site for receiving registration information from a station owner, and/or reports for displaying aggregated information to an owner or employee of a station.

The computer server 50 aggregate at least some of the information 15 about the vehicle, and/or the information 10 about the station 55. The computer server 50 can store such information, including the aggregated information, on a storage device (not shown) included in the computer server 50 or separate from the computer server 50. One or more reports can be generated based on the stored aggregated information, stored in the computer server 50, and/or provided to a vehicle operator or station owner.

For example, the computer server 50 can generate a vehicle energy usage report 220 (of FIG. 10) for the vehicle operator, and can indicate "Your Usage" to highlight that this usage is related to the vehicle operator's usage. The report 220 can include a graph showing the usage over time or for a particular date range; the graph can show the usage as Kilowatt/hour units, among other possibilities.

Similarly, the computer server 50 can generate a station energy usage report 320 (of FIG. 11) for the station owner, and can indicate "Vehicle Usage" to highlight the energy usage of a particular vehicle or patron. The report 320 for the station owner can be similar to the report 220 for a particular vehicle.

Additionally, the computer server 50 can generate a station energy usage report 215 (of FIG. 10) for the vehicle operator, which indicates energy usage that is related to a particular station at which the particular vehicle received charges. The report 215 can include a graph showing the usage over time or for a particular date range, and a particular station ID to identify the station. The graph can show the usage as Kilowatt/hour units for the particular station, among other possibilities.

Similarly, the computer server 50 can generate a station energy usage report 315 (of FIG. 10) for the station owner, which indicates energy usage that is related to a particular station at which all vehicles for that station have received charges. The report 315 can include a graph showing the usage over time or for a particular date range, and a particular station ID to identify the station. The graph can show the usage as Kilowatt/hour units for the particular station, among other possibilities.

Further, the computer server 50 can generate an energy sources information report, such as 240 or 340. The report 240 can include, for example, a pie chart showing percentages of energy usage, and their sources, for a particular vehicle. Other types of graphs or charts can be used. Conversely, the report 340 can include, for example, a pie chart showing percentages of energy usage, and their sources, for all vehicles that have received charges at a particular station.

Another is the station location identifier report 230 or 330. The 230 report can show different locations on a geographic map having indicators such as circles or dots. The circles or dots (among other possible shapes or indicators) show which stations were visited, or in other words, where a particular vehicle received a charge in relation to the location on the map. A vehicle operator can quickly assess his or her driving and/or charging habits. Moreover, a size of the dot or circle (or other indicator) can correspond to an amount of electricity used at that particular station. In addition, the reports can include a function to help the vehicle operator find stations that offer the charging capability. The report 230 can also include ratings of the reliability of the stations, which may be rated by other vehicle operators. The report 230 may also show the price of electricity at each station. Optionally, a zoom in/out adjuster allows the vehicle operator to zoom in on a particular geographic location, or zoom out to see a wider perspective. The report 330 is similar to the 230 report, and allows an owner of multiple stations to monitor energy usage or related location information for each of the stations. Alternatively, the report 330 allows the station owner to compare usage at their station to usage at other stations, view ratings of the reliability of other stations, and/or the price offered by other stations, among other possibilities.

Any of the reports mentioned above can be stored in the computer server 50 or displayed on a website, which can be accessed by computing devices, such as personal digital assistants (PDA) 140 or 150, computer 130, or mobile phones 110 or 120. For example, the computer server 50 can transmit the aggregated information or reports to one or more computing devices. The aggregated information or reports can be transmitted to the computing devices using Silent Messaging Service (SMS) text messages, automated voice calls, Internet web sites, and/or email, among other possibilities. As mentioned above, vehicle owners or operators can access the reports as well as station owners or employees.

Sign-up pages 200 and 300 provide a means for registering operators of vehicles or station owners. For example, sign-up page 200 can be used to register operators of vehicles who desire to have the ability to charge their vehicles, or who would otherwise want to monitor or track the energy usage of their vehicles. The sign-up page 200 can request home address information, vehicle information, and/or billing information, among other possibilities. Upon registration, a fob such as 30 or 31 can be shipped to the vehicle operators. Preferably, the fob that is shipped is associated with a particular vehicle, which is owned or operated by the person registering using page 200.

Similarly, sign-up page 300 can be used to register station owners. For example, if a station owner wants to adopt the "pay" model, the components related to such model, such as the station ID tags, switch component 70, and/or coordinator element 40, can be shipped to the station owner. If a station owner wants to adopt the "free" or "no charge" model, fewer components, such as the station ID tags, can be shipped. The station ID tags can be preconfigured with information 10 about the station 55, or alternatively, configured at the station 55.

Profile pages 210 and 310 can list account information for a particular vehicle operator or station owner. For example page 210 can show a vehicle operator account number, total energy usage information for a particular vehicle, stations visited for charges, and an account balance, among other suitable account-specific information. In a similar fashion, page 310 can show a station owner account number, total energy usage information, stations owned and monitored, and an account balance, which can include surcharges, for electricity distributed, among other suitable account-specific information.

Such reports allow vehicle operators and/or station owners to evaluate their "carbon footprint" based on, for example, whether the sources of energy are environment friendly, the amount of energy used, particular routes or amounts of travel, and so forth.

From the foregoing it will be appreciated that, although specific embodiments of the invention have been described herein for purposes of illustration, various modifications may be made without deviating from the spirit and scope of the invention.

For example, although the embodiments described above include a "free" model and a "pay" model, the "free" model can be upgraded to the "pay" model by adding one or more components, such as the switch component 70 and/or the coordinator element 40. The alternative configuration of components illustrated in FIGS. 4-8 can be used in any combination, for example, with components or elements illustrated in FIGS. 1-3 and/or FIGS. 9-11.

The "free" or "no charge" model need not require electrical work for installation, and can pinpoint the origin, type, and/or cost of the energy being used. Component and communication costs are reduced. Such infrastructure can be installed easily using, for example, adhesives, screws, or ties. The "free" model can be upgraded to the "pay" model by adding certain components, as explained above. The "free" model may include a "standalone" mode that allows vehicle operators to track their energy usage, even where there is no station ID tag or coordinator element. The operator can have access to real-time energy usage monitoring.

The "pay" model includes additional components, but that can be easily installed. The switch component can be placed at a breaker box, or instead, coupled to or otherwise associated with the plug outlet device. A particular station can be disabled remotely, for example, using a web site. Such model is flexible and provides control to both infrastructure operators and station owners. Station owners that provide charging to particular fleets of vehicles, for example, can deny charging capabilities to non-fleet vehicles. The "pay" model can be purposely converted to a "free" model by removing or bypassing certain components, such as the switch component or coordinator element.

The following discussion is intended to provide a brief, general description of a suitable machine or machines in which certain aspects of the invention can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the invention can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Other similar or non-similar modifications can be made without deviating from the intended scope of the invention. Accordingly, the invention is not limited except as by the appended claims.

What is claimed is:

1. A system, comprising:
one or more plug outlet devices associated with a station;
a coordinator element configured to receive vehicle information and information about the station from one or more vehicles; and
a normally-closed switch component operatively associated with the one or more plug outlet devices,
wherein the coordinator element is operatively associated with the switch component and configured to cause the normally-closed switch component to open and disconnect a source of electricity from the one or more plug outlet devices responsive to at least one of a presence and an absence of a wireless signal, and
wherein the coordinator element is configured to transmit a denial of service signal to the switch component responsive to a failure to verify at least one of the vehicle information and the information about the station, wherein the normally-closed switch component is configured to open and disconnect the source of electricity from at least one of the plug outlet devices responsive to the denial of service signal.

2. The system of claim 1, wherein the coordinator element is configured to wirelessly receive the vehicle information and the information about the station from the one or more vehicles.

3. The system of claim 2, wherein the coordinator element comprises a computer that is proximally located to the one or more plug outlet devices, the system further comprising:
a remote computer server operatively coupled to the proximally located coordinator element,
wherein the coordinator element is configured to transmit the vehicle information and the information about the station to the remote computer server.

4. The system of claim 3, wherein the remote computer server is configured to store the vehicle information and the information about the station.

5. The system of claim 4, wherein:
the vehicle information includes at least (a) a cryptographic key pair, (b) a vehicle identifier (ID), and (c) vehicle energy usage information; and
the information about the station includes at least (a) a station location identifier (ID) and (b) energy sources information.

6. The system of claim 4, wherein the remote computer server is configured to aggregate at least some of the vehicle information for a particular vehicle and the information about the station, and transmit said aggregated information to one or more computing devices, wherein said aggregated information includes:
a first report showing vehicle energy usage for the particular vehicle over time for a particular date range;
a second report showing station energy usage that is related to a particular station at which the particular vehicle received charges;
a third report showing energy sources information including percentages of energy usage, and their sources, used to charge the particular vehicle; and
a fourth report including a geographic map having indicators at different locations, wherein the indicators indicate where the particular vehicle received a charge in relation to the different locations on the map,
wherein the aggregated information is accessible to an operator of the particular vehicle from the one or more computing devices.

7. The system of claim 4, wherein the remote computer server is configured to aggregate at least some of the vehicle information for a plurality of vehicles and the information about the station, and transmit said aggregated information to one or more computing devices, wherein said aggregated information includes:
a first report showing vehicle energy usage for a particular vehicle from among the plurality of vehicles over time for a particular date range;
a second report showing station energy usage that is related to the station at which all of the plurality of vehicles received charges over time for a particular date range;
a third report showing energy sources information including percentages of energy usage, and their sources, used to charge all of the plurality of vehicles at the station; and
a fourth report including a geographic map having indicators at different locations, wherein the indicators indicate where the plurality of vehicles received a charge in relation to the different locations on the map,
wherein the aggregated information is accessible to an owner of the station from the one or more computing devices.

8. The system of claim 1, wherein each of the one or more plug outlet devices includes information about the station.

9. The system of claim 8, wherein the coordinator element is configured to detect at least one of the presence and the absence of the wireless signal.

10. The system of claim 9, wherein:
the coordinator element is configured to receive the wireless signal from the one or more vehicles; and
the wireless signal includes the vehicle information and the information about the station.

11. The system of claim 10, wherein:
the switch component includes a detector to sense an electrical current draw and generate a current draw detection signal; and
the coordinator element is configured to receive the current draw detection signal from the switch component.

12. The system of claim 11, wherein the coordinator element is configured to verify the presence of the wireless signal and at least one of the vehicle information and the information about the station responsive to the current draw detection signal.

13. The system of claim 12, further comprising:
a remote computer server coupled to the coordinator element,
wherein the coordinator element is configured to verify at least one of the vehicle information and the information about the station with the remote computer server.

14. The system of claim 11, wherein the coordinator element is configured to transmit a denial of service signal to the switch component in the absence of the wireless signal and responsive to the current draw detection signal.

15. The system of claim 1, wherein the source of electricity is coupled to the switch component, and wherein the information about the station is stored in a station identifier (ID) tag.

16. The system of claim 15, further comprising:
one or more vehicles,
wherein the station ID tag is configured to transmit a station ID toward the one or more vehicles.

17. The system of claim 16, wherein the station ID tag comprises at least one of a radio frequency identifier (RFID) tag, an infrared emitter, an optical emitter, and a radio signal.

18. The system of claim 16, wherein the station ID tag comprises an autonomous tag configured to transmit the station ID at predefined time intervals.

19. The system of claim 16, wherein the station ID tag comprises a presence-sensor to sense a presence of the one or more vehicles and to transmit the station ID responsive to the sensed presence.

20. The system of claim 16, wherein:
the station ID tag is attached to a cord that is coupled to the one or more plug outlet devices.

21. The system of claim 16, wherein the station ID tag is substantially permanently secured to the one or more plug outlet devices.

22. The system of claim 16, further comprising a fob to receive the station ID from the station ID tag.

23. The system of claim 22, wherein the station ID tag is configured to unidirectionally transmit the station ID to the fob.

24. The system of claim 22, wherein:
the fob is attached to a cord that is coupled to the one or more vehicles.

25. The system of claim 22, wherein:
a plug adapter includes the fob; and
the plug adapter is coupled to the one or more vehicles.

26. The system of claim 22, wherein the one or more vehicles include a plug inlet, and the fob is attached to the plug inlet.

27. The system of claim 22, wherein the one or more vehicles include the fob.

28. The system of claim 22, wherein the fob includes a receiver to receive the station ID and a transmitter to wirelessly transmit the station ID and the vehicle information to at least one of the coordinator element and a remote computer server.

29. The system of claim 28, wherein:
the fob is coupled to a current sensor to sense an amount of electrical current received from the one or more plug outlet devices; and
the vehicle information includes the amount of electrical current received.

30. The system of claim 29, wherein the vehicle information includes a vehicle identifier (ID).

31. The system of claim 29, wherein the vehicle information includes a cryptographic key pair.

32. A method for monitoring the distribution of electricity to electric vehicles, comprising:
connecting a source of electricity to one or more plug outlet devices associated with a station;
transmitting information about the station from the one or more plug outlet devices to a fob associated with a vehicle;
wirelessly receiving, by a coordinator element that is proximally located to the one or more plug outlet devices, using a short-distance wireless connection, information about the vehicle and information about the station from the fob;
transmitting, by the coordinator element, to a normally-closed switch component, a denial of service signal responsive to a failure to verify at least one of the information about the vehicle and the information about the station; and
causing, by the coordinator element, the normally-closed switch component to open and disconnect a source of electricity from the one or more plug outlet devices responsive to the denial of service signal.

33. The method of claim 32, wherein the fob is attached to the vehicle.

34. The method of claim 32, wherein the coordinator element comprises a computer proximally located to the vehicle, the method further comprising:
transmitting the information about the vehicle and the information about the station from the proximally located computer to a remote computer server;
aggregating at least some of the information about the vehicle and the information about the station; and
storing the aggregated information in the remote computer server.

35. The method of claim 34, further comprising:
generating, by the remote computer server, a first report showing vehicle energy usage for the vehicle over time for a particular date range;
generating, by the remote computer server, a second report showing station energy usage that is related to the station at which the vehicle received charges;
generating, by the remote computer server, a third report showing energy sources information including percentages of energy usage, and their sources, used to charge the vehicle; and
generating, by the remote computer server, a fourth report including a geographic map having indicators at different locations, wherein the indicators indicate where the vehicle received a charge in relation to the different locations on the map;
storing the first, second, third, and fourth reports in the remote computer server; and
transmitting at least one of the first report, the second report, the third report, and the fourth report to one or more computing devices accessible by an operator of the vehicle.

36. The method of claim 34, wherein aggregating further comprises aggregating at least some of the information about the vehicle for a plurality of vehicles and the information about the station, the method further comprising:
generating, by the remote computer server, a first report showing vehicle energy usage for a particular vehicle from among the plurality of vehicles over time for a particular date range;
generating, by the remote computer server, a second report showing station energy usage that is related to the station at which all of the plurality of vehicles received charges over time for a particular date range;
generating, by the remote computer server, a third report showing energy sources information including percentages of energy usage, and their sources, used to charge all of the plurality of vehicles at the station;
generating, by the remote computer server, a fourth report including a geographic map having indicators at different locations, wherein the indicators indicate where the plurality of vehicles received a charge in relation to the different locations on the map;
storing the first, second, third, and fourth reports in the remote computer server; and
transmitting at least one of the first report, the second report, the third report, and the fourth report to one or more computing devices accessible by an owner of the station.

37. The method of claim 36, further comprising:
displaying at least one of the first, second, third, and fourth reports on a web site.

38. The method of claim 32, further comprising:
registering a plurality of operators of vehicles using a web site; and
shipping a fob to each of the vehicle operators,
wherein the fob is associated with one of the vehicles.

39. The method of claim 38, the method further comprising:
- the fob unidirectionally receiving the information about the station from the one or more plug outlet devices; and
- the fob transmitting the information about the vehicle and the information about the station to at least one of the coordinator element and a remote computer server.

40. A system, comprising:
one or more plug outlet devices associated with a station;
a normally-closed switch component operatively associated with the one or more plug outlet devices;
a coordinator element operatively associated with the switch component and configured to cause the normally-closed switch component to open and disconnect a source of electricity from the one or more plug outlet devices responsive to at least one of a presence and an absence of a wireless signal; and
a remote computer server coupled to the coordinator element,
wherein:
- the coordinator element is configured to receive the wireless signal from one or more vehicles;
- the wireless signal includes information about the one or more vehicles and information about the station;
- the coordinator element is configured to verify at least the information about the one or more vehicles with the remote computer server;
- the coordinator element is configured to transmit a denial of service signal to the switch component responsive to a failure to verify the information about the one or more vehicles; and
- the normally-closed switch component is configured to open and disconnect the source of electricity from at least one of the plug outlet devices responsive to the denial of service signal.

41. The system of claim 40, wherein the normally-closed switch component is configured to cause the one or more vehicles to begin to draw current from the source of electricity through the one or more plug outlet devices when the one or more vehicles are plugged into the one or more plug outlet devices.

42. The system of claim 40, wherein the coordinator element is separate from and proximally located to the one or more plug outlet devices, and the remote computer server is configured to aggregate at least some of the vehicle information for a particular vehicle and the information about the station, and transmit said aggregated information to one or more computing devices, wherein said aggregated information includes:
- a first report showing vehicle energy usage for the particular vehicle over time for a particular date range;
- a second report showing station energy usage that is related to a particular station at which the particular vehicle received charges;
- a third report showing energy sources information including percentages of energy usage, and their sources, used to charge the particular vehicle; and
- a fourth report including a geographic map having indicators at different locations, wherein the indicators indicate where the particular vehicle received a charge in relation to the different locations on the map,
- wherein the aggregated information is accessible to an operator of the particular vehicle from the one or more computing devices.

43. The system of claim 42, wherein the indicators of the fourth report further comprise different sizes of indicators corresponding to an amount of electricity used at a particular station.

44. The system of claim 40, wherein the coordinator element is separate from and proximally located to the one or more plug outlet devices, and the remote computer server is configured to aggregate at least some of the vehicle information for a plurality of vehicles and the information about the station, and transmit said aggregated information to one or more computing devices, wherein said aggregated information includes:
- a first report showing vehicle energy usage for a particular vehicle from among the plurality of vehicles over time for a particular date range;
- a second report showing station energy usage that is related to the station at which all of the plurality of vehicles received charges over time for a particular date range;
- a third report showing energy sources information including percentages of energy usage, and their sources, used to charge all of the plurality of vehicles at the station; and
- a fourth report including a geographic map having indicators at different locations, wherein the indicators indicate where the plurality of vehicles received a charge in relation to the different locations on the map,
- wherein the aggregated information is accessible to an owner of the station from the one or more computing devices.

45. The system of claim 44, wherein the indicators of the fourth report further comprise different sizes of indicators corresponding to an amount of electricity used at a particular station.

46. The method of claim 35, wherein generating the fourth report further includes:
- showing different sizes of indicators corresponding to an amount of electricity used at a particular station.

47. The method of claim 36, wherein generating the fourth report further includes:
- showing different sizes of indicators corresponding to an amount of electricity used at a particular station.

* * * * *